Feb. 11, 1936.  F. CZEMBA  2,030,354
VERNIER GUAGE
Filed June 27, 1931

Inventor:
Frank Czemba,
By Usina and Rauber Attys

Patented Feb. 11, 1936

2,030,354

UNITED STATES PATENT OFFICE 2,030,354

VERNIER GAUGE

Frank Czemba, Duluth, Minn., assignor to American Steel & Wire Company, Chicago, Ill., a corporation of New Jersey Application June 27, 1931, Serial No. 547,324

9 Claims. (Cl. 33—143)

The invention relates to new and useful improvements in measuring gauges and particularly to a vernier type of gauge for measuring the web thickness of sections such as channels and beams.

It has been customary to measure such sections by an ordinary micrometer or gauge but this has proven slow and costly since in order to measure the web thickness the micrometer must be opened much farther than necessary and as the screw feed of micrometers is slow much time is lost in this unnecessary opening and closing. Also the bars or sections in many cases must be stopped in order to secure the measurements, which generally results in the loss of a length of material due to uneven rolling, thus increasing the cost of production.

An object of the invention is the provision of a caliper or gauge which will measure accurately and quickly the type of sections described without interruption to the rolling operation.

A further object is to provide a vernier type of caliper having one measuring arm mounted for swinging movement with relation to the other, whereby the instruments can be readily applied to the work to be measured with the elimination of unnecessary opening and closing of the measuring arm.

Another object is to provide a caliper with rollers for engaging the work piece being measured.

With these and various other objects in view, the invention may consist of certain novel features of construction and operation as will be more fully described and particularly pointed out in the specification, drawing and claims appended hereto.

In the drawing which illustrates an embodiment of the device, and wherein like reference characters are used to designate like parts—

Figure 1:
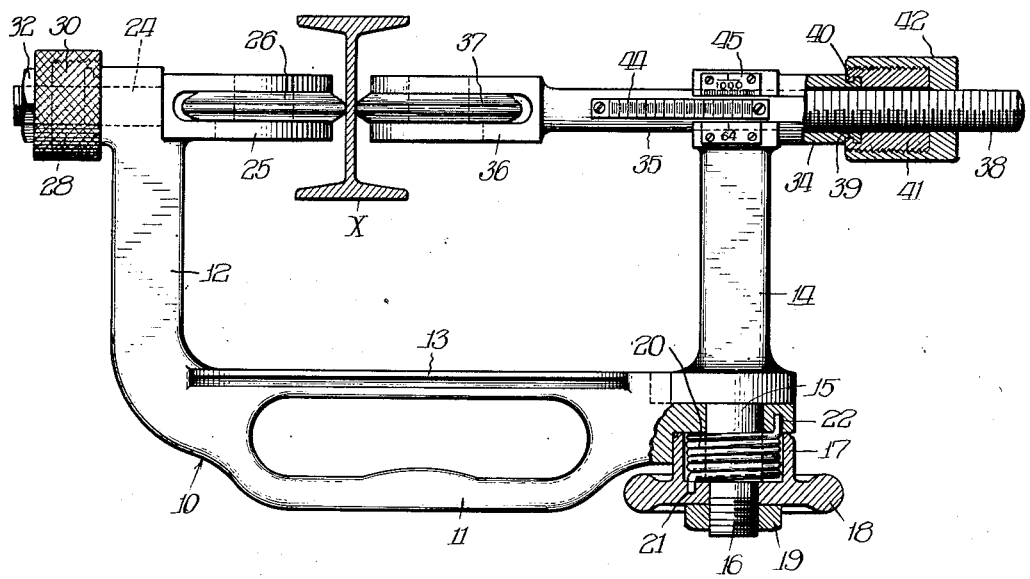
Figure 1 is a side elevational view, parts being shown in section, of the vernier type of gauge constructed in accordance with the present invention.

The embodiment of the invention selected for illustration comprises a frame 10 having a handle 11 and arm 12 formed integral therewith. Also integral with the frame and positioned in front of the handle 11 is a shield 13 which serves to protect the hand of the operator from the intense heat of the rolled sections being measured.

Rotatably mounted in the frame 10 and spaced from arm 12 is a second arm 14 having a reduced portion 15 by which the same is mounted in an opening in the frame, the portion 15 being threaded at 16. The frame is recessed for receiving the hub 17 of the hand wheel 18, which is mounted on the reduced portion 15 of arm 14 and suitably secured by means of the nut 19 which holds the hand wheel against a shoulder provided on the portion. The hand wheel is operated in order to impart swinging movements to the arm 14 and in order that the arm may be automatically returned to a predetermined position a coil spring 20 is located within hub 17 and is secured at one end as at 21 to the hand wheel and at its other end, as at 22, to the frame 10. Rotation of the arm 14 is therefore accomplished against the tension of the coil spring which functions to return the arm so that the caliper member carried thereby will be positioned substantially vertically.

Arm 12 at its extreme outer end is provided with a bore for receiving the caliper member 24 which is bifurcated at its inner end to provide spaced arms 25 within which is rotatably mounted the hardened steel roller 26, the outer end being threaded for receiving adjusting means. Adjustment of the caliper member 24 is accomplished by groove 29 formed on the arm which receives the inturned lips 27 of an exteriorly threaded sleeve 28, the sleeve having threaded thereto a cylinder 30, the members being locked in adjusted position by set screw 31.

Cylinder 30 also has threaded engagement with the threaded end of the caliper member 24 and thus rotation of the cylinder functions to cause vertical reciprocation of the member 24 with respect to arm 12. The nut 32, also threaded to the threaded end of member 24, functions to lock the member in adjusted position.

Arm 14 is provided with extension 34 which is bored for receiving the caliper member 35, the member having its inner end bifurcated to form spaced arms 36 for receiving the hardened steel roller 37 and its outer end threaded as at 38. Extension 34 is provided with a groove 39 which receives the inturned lips 40 formed on the exteriorly threaded sleeve 41 which mounts the sleeve for rotation on the extension 34 independent of the caliper member 35. An exteriorly knurled cylinder 42 is suitably threaded to end 38 of the caliper member and is also threaded to the sleeve 41, being locked in position on sleeve 41 by set screw 43. By rotation of the cylinder 42 the sleeve 41 is correspondingly rotated but the parts are held to the extension 34 by the groove and lips described. This rotation of cylinder 42, since the same is threaded to portion 38 of the caliper member, functions to cause movement of the member with respect to arm 14 in a direction toward and away from its companion member 24. This movement of caliper member 35 is accurately measured by means of a vernier including a scale 44 having graduations provided thereon and an associated scale 45 also provided with suitable graduations. The distance between the rollers 37 and 26 can therefore be determined by the relationship of the graduations on scale 44 with respect to scale 45. The rollers engage the work being measured and permit movement of the work while the same are being taken. The accuracy of the measurements can be checked from time to time and any wear on the rollers can be taken up by adjustment of the member 24.

Figure 2:
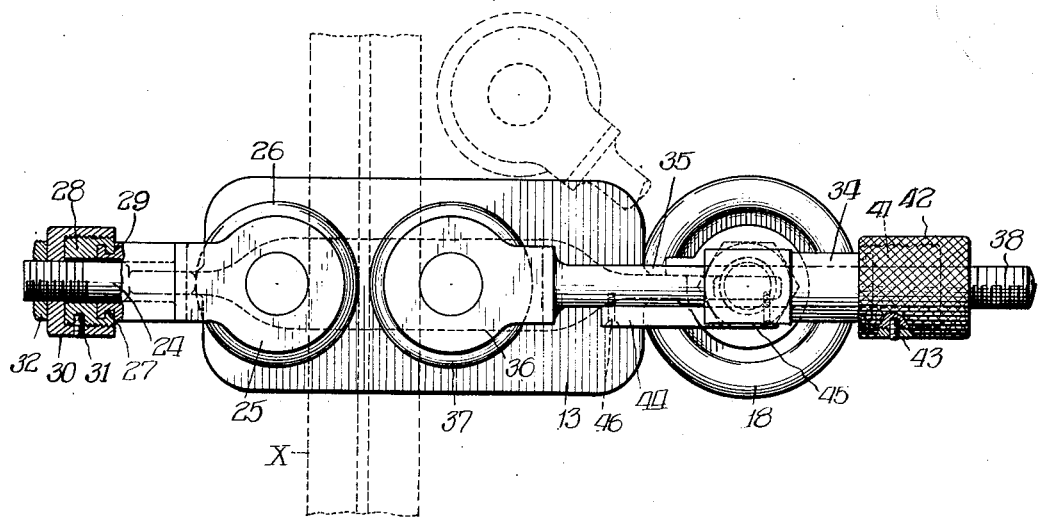
Figure 2 is a rear elevational view of the same.

From the foregoing and accompanying drawing it is seen that the present device will function to readily measure the web thickness of I-beams X or other similar sections and will permit such measurements to be accomplished without any interruption to the rolling operation. By means of the rotatable arm 14 carrying the caliper member 35 the member can be rotated to a position wherein it is parallel to the length of the work piece being measured and thus in operation to measure the web thickness of a beam X, arm 14 is rotated by means of the hand wheel 18 against the tension of coil spring 20 so as to swing the caliper member 35 carrying the measuring roller 27 outwardly in a direction away from the vertical as shown in dotted lines in Figure 2, to permit the device to be applied to the work. Upon release of the hand wheel 18 the coil spring will function to cause return of the member 35 to a position directed toward its associated caliper member and with the caliper members in this position rotation of member 42 is effected to cause the roller 37 to contact with the web of the piece, whereupon the thickness is measured on scale 45.

To remove the device from the work it is not necessary to retract the caliper member 35 since by grasping the hand wheel 18 the member can be swung outwardly again and the device removed, as will be clearly understood.

Although there has been shown and described only one embodiment of the invention, it is clear that the same is not limited to the specific arrangement and construction of parts since various changes may be made within the scope of the appended claims.

I claim:

1. A measuring instrument comprising a frame, one end of said frame receiving a caliper member, an arm journalled in the other end of the frame, a caliper member mounted for reciprocation in said arm, a handle wheel having a hub portion fixedly secured to the arm for rotating the same, and a coil spring encircling the arm and enclosed in the hub portion, said spring being secured at one end to the frame and at the other end to the wheel to yieldingly hold the arm in normal position with its caliper member directed toward the other member on the frame.

2. A measuring instrument comprising a frame, a caliper member adjustably positioned in the frame, an arm journalled in the frame and locating a caliper member for association with the first named member, a handle wheel fixedly secured to the arm for rotating the same, and resilient means for normally maintaining the arm in position with its caliper member directed toward the associated member.

3. A measuring instrument comprising a substantially L-shaped frame, a caliper member mounted in one leg of the frame, an arm journalled in the other leg of the frame, a caliper member mounted for reciprocation in the arm, means resiliently maintaining the arm in position with its caliper member directed toward the associated member, whereby rotation of the arm against the resilient means allows location of the article to be measured between the caliper members.

4. A measuring instrument comprising a frame of substantially L-shape, one leg providing a supporting arm and carrying at its end a caliper member, the other leg providing a handle portion, a second supporting arm rotatably mounted in the end of said handle portion, a second caliper member mounted in said rotatable supporting arm, and resilient means interposed between the frame and the rotatable arm yieldingly biasing the arm to maintain the caliper members in alignment.

5. A measuring instrument comprising a frame of substantially L-shape, one leg providing a supporting arm and carrying at its end a caliper member, the other leg providing a handle portion, a second supporting arm rotatably mounted in the end of said handle portion, a second caliper member reciprocably mounted in the rotatable arm, rotatable means for causing reciprocation of said second caliper member, and resilient means interposed between the frame and the rotatable arm yieldingly biasing the arm to maintain the caliper members in alignment.

6. A measuring instrument comprising a frame having a portion providing a handle, caliper members carried by said frame, one of said members being rotatably mounted in the frame, means associated with said rotatable member for indicating the distance between members when in substantial alignment, and resilient means yieldingly holding said rotatable caliper member in alignment with the other member and resisting rotation of said rotatable member.

7. A measuring instrument comprising a frame providing at one end an upstanding supporting arm, a second supporting arm rotatably mounted in the other end of said frame, a caliper member carried by each of said arms respectively, said rotatable arm mounting its caliper member for reciprocation in a direction normal to the longitudinal axis of rotation of said arm, and said last mentioned caliper member being rotatable through rotation of said arm in a plane substantially normal to the axis of rotation of said arm.

8. A measuring instrument comprising a frame, an arm rotatably mounted in said frame, a pair of caliper members carried by said frame and arm respectively, one of said caliper members being mounted for reciprocation to vary the distance between the members when they are directed toward each other, and means associated with said reciprocating member for indicating the distance between members, the said caliper member mounted in the rotatable arm having rotation in a plane within which is located said other caliper member.

9. A measuring instrument comprising a frame, an arm rotatably mounted in said frame, a pair of caliper members mounted in the frame and rotatable arm respectively, one of said members being mounted for reciprocation to vary the distance between the members when they are directed toward each other, means associated with said reciprocating member for measuring the distance between said members, and rollers mounted on the adjacent ends of said caliper members for engaging the piece being measured, the said caliper member carried by the rotatable arm having rotation in a plane disposed at right angles to the axis of rotation of the arm and said plane including said other caliper member.

FRANK CZEMBA.